Dec. 12, 1961
C. A. SEABRIGHT
3,012,898
YELLOW PIGMENTS
Filed Dec. 10, 1959
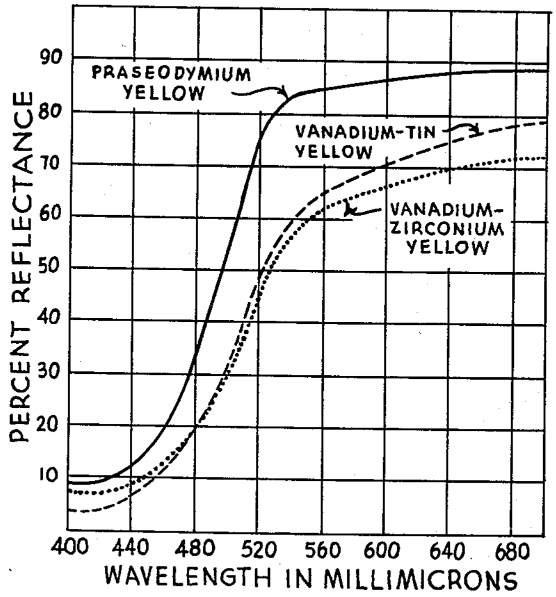
FIG. I
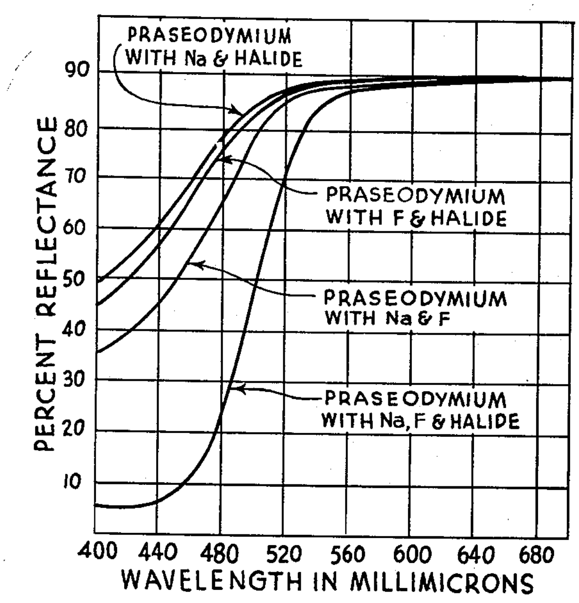
FIG II
CLARENCE A. SEABRIGHT, *INVENTOR.*
BY
Robert J. Blake Atty.

United States Patent Office 3,012,898

Patented Dec. 12, 1961

1

3,012,898

YELLOW PIGMENTS

Clarence A. Seabright, Lakewood, Ohio, assignor to The Harshaw Chemical Company, Cleveland, Ohio, a corporation of Ohio Filed Dec. 10, 1959, Ser. No. 858,737

10 Claims. (Cl. 106—299)

This invention relates to ceramic pigments and especially to a novel class of yellow pigments containing praseodymium.

Various yellow pigments of the ceramic type are known to the art, such as cadmium yellows, uranium yellows, vanadium-tin yellows, and vanadium-zirconium yellows. Cadmium yellows and uranium yellows are presently employed only in limited amounts in the field of ceramic pigments. The limited usage of these pigments is due to the fact that cadmium yellows will fire out at very low temperatures, and uranium yellows are weak and use is restricted by the Atomic Energy Commission. Vanadium-tin yellows and vanadium-zirconium yellows, while extensively employed as ceramic pigments, have a brownish tone and are off-yellows rather than pure yellows. It has recently been found that certain rare earth compositions containing praseodymium when combined with certain color fixing agents would produce yellow ceramic pigments not having a brownish tone.

Praseodymium compositions merely consisting of coloring agents and color fixing agents, however, will not produce a yellow coloration below certain minimum firing temperatures. The minimum firing temperatures are in a range from 900° C. to 1000° C. However, even when these minimum firing temperatures are exceeded the yellow coloration is very often a weak color and, therefore, undesirable. The term weak color as employed in the field of ceramic pigments may be defined as a color which exhibits a low tinctorial strength. The defects in praseodymium pigments and praseodymium pigment processes are believed to be the result of the inability of the praseodymium coloring agent to combine with the color fixing agent.

It is, therefore, an object of this invention to produce a praseodymium pigment which consistently exhibits a pleasing yellow coloration at relatively low firing temperatures.

It is a further object of this invention to produce a praseodymium pigment having a strong yellow color.

I have now discovered that the addition of certain mineralizer compositions to a praseodymium calcination mixture will produce a yellow ceramic pigment of enhanced color properties at lower calcination temperatures.

The novel process of this invention is carried out by calcining an intimate mixture of compounds of zirconium capable of yielding zirconium oxide, compounds of praseodymium capable of yielding praseodymium oxide, compounds of silicon capable of yielding silicon oxide, and a mineralizer composition consisting essentially of a source of alkali metal ions, a source of fluoride ions and a source of halide ions selected from the group consisting of chlorine and bromine ions. The calcination is carried out in a closed sagger, which provides calcination substantially out of contact with the air, at a temperature range of from 800° C. to 1100° C. The optimum temperature range being from 825° C. to 950° C. The praseodymium compound capable of yielding praseodymium oxide is present in the range of from 0.5% by weight to 10.0% by weight expressed as $Pr_6O_{11}$, and may be a compound such as, for instance, praseodymium chloride, praseodymium nitrate, praseodymium oxalate, praseodymium oxide, praseodymium fluoride, praseodymium sulfate, and praseodymium carbonate. The silicon compound capable of yielding silicon oxide is present in the range of from 10% by weight to 55% by weight expressed as $SiO_2$ and may be silicon dioxide or silicic acid. The zirconium compound capable of yielding zirconium oxide is present in the range of from 35% by weight to 80% by weight expressed as $ZrO_2$ and may be a compound such as, for instance, zirconium oxide, zirconium hydroxide or zirconium carbonate. The mineralizer consists of a source of alkali metal ions, fluoride ions, and halide ions other than fluoride ions, wherein the source of fluoride ions may be a fluoride compound such as, for instance, sodium fluoride, sodium chloride, sodium bromide, lithium fluoride and potassium fluoride. The source of fluoride ions may be afluoride compound such as, for instance, sodium fluoride, lithium fluoride, potassium fluoride, zirconium oxyfluoride, ammonium bifluoride, etc., and the source of halide ions may be a halide compound such as, for instance, ammonium chloride, sodium chloride, sodium bromide, zirconium oxychloride, zirconium tetrachloride and praseodymium chloride.

The mineralizer composition appears to have the ability to open the crystal lattice of the color fixing agent, thereby allowing the entry of increased amounts of praseodymium coloring agent. The entry of increased amounts of coloring agent results in a minimum firing temperature of 800° C. which consistently produces yellow colors of a strength superior to any previous praseodymium yellow. It should be understood that the mineralizer composition of this invention requires the presence of three critical ions and that these critical ions may be derived from the calcination mixture compounds of zirconium and the calcination mixture compounds of praseodymium or may be derived from compound specially placed in the calcination mixture as a source of critical ion or ions. The mineralizer composition must be present in the praseodymium calcination mixture in amounts such that from 0.25% by weight to 8.0% by weight of alkali metal ions are present, from 0.25% by weight to 3.0% by weight of fluoride ions are present and from 0.25% by weight to 8.0% by weight of halide ions other than fluoride ions are present.

The following specific procedures are given for purposes of illustration of the invention and are not considered to limit the spirit or scope of the invention:

I 8.7 grams of praseodymium chloride were dissolved in water and mixed with 6 grams of ammonium chloride, 3 grams of sodium fluoride, 31 grams of silica and 63 grams of zirconium oxide to form a paste. The paste was then dried, broken up and hammer milled. The hammer milled mixture was calcined in a covered sagger at about 900° C. The calcined mixture was then hammer milled and the resulting product was a strong yellow ceramic pigment.

II 63 grams of zirconium oxide, 31 grams of silica, 6.0 grams of praseodymium oxalate, 3 grams of sodium fluoride, and 4 grams of sodium chloride were hammer milled through a fine screen. The hammer milled mixture was then calcined in a covered sagger at about 900° C. The calcined mixture was again pulverized through a hammer mill and the resulting product was a strong yellow ceramic pigment.

III 63 grams of zirconium oxide, 31 grams of silica, 6.0 grams of praseodymium oxalate, 6 grams of zirconium oxyfluoride, 6 grams of sodium chloride were hammer milled through a fine screen. The hammer milled mixture was calcined at a temperature of 835° C. in a covered sagger. The calcined mixture was again hammer milled and the resulting product was a strong yellow ceramic pigment.

The advantages of the novel pigment of this invention will be more readily apparent from the description of the drawings which follow:

The drawings are color comparisons in the form of plotted curves which compare the praseodymium pigment of this invention with yellow pigments of the prior art and with praseodymium composition wherein critical components have been deleted. The curves were produced by a Hardy Recording Spectrophotometer from samples containing 8% pigment in a typical Cone 02 tile glaze placed on a ceramic tile body.

FIGURE 1 is a graphic representation of the color of three yellow ceramic tiles, plotting percentage reflectance against wave-lengths in millimicrons. The solid line in FIGURE 1 designates the novel praseodymium pigment of this invention. The broken line represents a vanadium-tin ceramic pigment, and the dotted line represents a vanadium-zirconium ceramic pigment. The solid line represents a praseodymium pigment curve and it should be noted that the praseodymium pigment curve exhibits the sharpest break in the yellow wavelength, that is, the slope of the praseodymium pigment curve approaches the ideal vertical position of a pure yellow. The vanadium-tin and vanadium-zirconium curves, however, have a less pronounced curve, which is indicative of off-yellow pigments having a brownish tone.

FIGURE 2 is a graphic representation of the color of four praseodymium yellow pigments, wherein percent reflectance is plotted against wave-length in millimicrons. It should be understood that the term halide as used in the legend is limited to chlorine ions and bromine ions. The curve designated as praseodymium with sodium and halide represents a praseodymium yellow wherein the mineralizer component did not contain a source of fluorine ions. The curve designated as praseodymium with F and halide represents a praseodymium yellow pigment wherein the mineralizer component did not contain a source of alkali metal ions. The curve designated as praseodymium with Na and F represents a praseodymium yellow pigment wherein the mineralizer did not contain a source of halide ions selected from the group consisting of chlorine and bromine ions. The curve designated as praseodymium with Na, F and halide represents a praseodymium yellow pigment wherein the mineralizer component contains the three critical ions, that is, source of alkali metal ions, a source of fluorine ions, and a source of halide ions selected from the group consisting of chlorine and bromine ions. It is notable that only the curve which contains the three critical mineralizer ions exhibits a sharp break in the yellow wavelength. While the curve containing the three critical mineralizer ions employs sodium as a source of alkali metal ions, a curve of a praseodymium yellow containing the three critical mineralizer ions and potassium or lithium as a source of alkali metal ions would produce a nearly identical curve. The praseodymium yellows which are lacking in any one of the three critical mineralizer ions exhibit only a gradual slope beginning at a percent reflectance of from 35% to 50%, which is indicative of weak color formation.

The following table discloses the compositions used to produce the curves shown in FIGURE 2 and also additional preferred compositions of this invention.

*Praseodymium yellows*

| | A | B | C | D | E | F | G | H | I | J | K |
|---|---|---|---|---|---|---|---|---|---|---|---|
| Zirconium Oxide | 63.0 | 63.0 | 57.0 | 63.0 | 63.0 | 63.0 | 60.0 | 63.0 | 63.0 | 63.0 | 63.0 |
| Silica | 31.0 | 31.0 | 31.0 | 31.0 | 31.0 | 31.0 | 31.0 | 31.0 | 31.0 | 31.0 | 31.0 |
| Praseodymium Oxalate | 6.0 | 6.0 | 6.0 | 6.0 | 6.0 | 10.0 | 6.0 | ---- | 6.0 | 6.0 | ---- |
| Sodium Fluoride | 3.0 | ---- | ---- | 3.0 | 3.0 | 3.0 | 3.0 | 3.0 | ---- | ---- | 3.0 |
| Ammonium Chloride | 4.0 | 4.0 | ---- | ---- | ---- | ---- | ---- | 6.0 | ---- | 6.0 | ---- |
| Sodium Carbonate | ---- | 4.5 | ---- | ---- | ---- | ---- | ---- | ---- | ---- | ---- | ---- |
| Zirconium Oxyfluoride | ---- | ---- | 6.0 | ---- | ---- | ---- | ---- | ---- | 6.0 | ---- | ---- |
| Zirconium Oxychloride | ---- | ---- | 8.0 | ---- | ---- | ---- | 8.0 | ---- | ---- | ---- | ---- |
| Sodium Chloride | ---- | ---- | ---- | ---- | 4.0 | 4.0 | ---- | ---- | 6.0 | ---- | 4.0 |
| Praseodymium Chloride | ---- | ---- | ---- | ---- | ---- | ---- | ---- | 8.7 | ---- | ---- | ---- |
| Lithium Fluoride | ---- | ---- | ---- | ---- | ---- | ---- | ---- | ---- | ---- | 3.0 | ---- |
| Praseodymium Oxide | ---- | ---- | ---- | ---- | ---- | ---- | ---- | ---- | ---- | ---- | 3.0 |
| Color | Yellow | White | Cream White | Pale Yellow | Yellow | Orange Yellow | Yellow | Yellow | Yellow | Yellow | Yellow |
| Temperature, ° C | 835 | 835 | 900 | 835 | 900 | 835 | 900 | 900 | 835 | 835 | 835 |

The compositions of the table which are designated as A through D are represented by corresponding color curves in FIG. 2. Composition A corresponds to the curve designated by the legend "praseodymium with Na, F and halide." Composition B corresponds to the curve designated by the legend, "praseodymium with Na and halide." Composition C corresponds to the curve designated by the legend "praseodymium with F and halide." Composition D corresponds to the curve designated by the legend "praseodymium with Na and F." Compositions E through K are representative of additional preferred compositions of the invention.

Having thus disclosed my invention, what I claim is:

1. A method of preparing a yellow ceramic pigment comprising calcining substantially out of contact with air a mixture of from 35% by weight to 80% by weight of zirconium oxide, from 10% to 55% by weight of silicon dioxide, and from 0.5% by weight to 10.0% by weight, expressed as $Pr_6O_{11}$, of praseodymium oxalate, and a mineralizer composition consisting essentially of sodium fluoride and sodium chloride; said sodium fluoride and sodium chloride being present in amounts such that from 0.25% by weight to 8.0% by weight of sodium ions are present, from 0.25% by weight to 3.0% by weight of fluoride ions are present and from 0.25% to 8.0% by weight of chloride ions are present, at a calcination temperature of from 800° C. to 1100° C.

2. The method of claim 1 wherein the calcination temperature is in the range of 825° C. to 950° C.

3. The method of preparing a yellow ceramic pigment comprising calcining substantially out of contact with air a mixture of compounds consisting essentially of from 35% by weight to 80% by weight expressed as $ZrO_2$ of at least one compound capable of yielding zirconium oxide, from 0.5% by weight to 10% by weight expressed as $Pr_6O_{11}$ of at least one compound capable of yielding praseodymium oxide, from 10% by weight to 55% by weight expressed as $SiO_2$ of at least one compound capable of yielding silicon oxide, a source of alkali metal ions present in amounts such that there is 0.25% by weight to 8.0% by weight of alkali metal ions present in the calcination mixture, a source of fluoride ions present in amounts such that there is 0.25% by weight to 3.0% by weight of fluoride ions present in the calcination mixture, and a source of halide ions selected from the group consisting of chloride and bromide ions present in amounts such that there is 0.25% by weight to 8.0% by weight of halide ions other than fluoride ions present in the calcination mixture, said calcination being carried out at a calcination temperature of at least 800° C.

4. The method of claim 3 wherein the source of fluoride ions and the source of halide ions selected from the group consisting of chloride and bromide ions is a compound selected from the group consisting of compounds capable of yielding zirconium oxide, compounds capable of yielding praseodymium oxide and mixtures thereof.

5. The method of claim 3 wherein the source of fluoride ions is a compound selected from the group consisting of compounds capable of yielding zirconium oxide, compounds capable of yielding praseodymium oxide and mixtures thereof.

6. The method of claim 3 wherein the source of halide ions selected from the group consisting of chloride and bromide ions is a compound selected from the group consisting of compounds capable of yielding zirconium oxide, compounds capable of yielding praseodymium oxide and mixtures thereof.

7. The method of preparing a yellow ceramic pigment comprising calcining substantially out of contact with air a mixture of compounds consisting essentially of from 35% by weight to 80% by weight expressed as $ZrO_2$ of at least one compound capable of yielding zirconium oxide, from 0.5% by weight to 10% by weight expressed as $Pr_6O_{11}$ of at least one compound capable of yielding praseodymium oxide, from 10% by weight to 55% by weight expressed as $SiO_2$ of at least one compound capable of yielding silicon oxide, a source of alkali metal ions present in amounts such that there is 0.25% by weight to 8.0% by weight of alkali metal ions present in the calcination mixture, a source of fluoride ions present in amounts such that there is 0.25% by weight to 3.0% by weight of fluoride ions present in the calcination mixture, and a source of halide ions selected from the group consisting of chloride and bromide ions present in amounts such that there is 0.25% by weight to 8.0% by weight of halide ions other than fluoride ions present in the calcination mixture, said calcination being carried out at a calcination temperature of from 800° C. to 1100° C.

8. The method of claim 7 wherein the source of fluoride ions and the source of halide ions selected from the group consisting of chloride and bromide ions is a compound selected from the group consisting of compounds capable of yielding zirconium oxide, compounds capable of yielding praseodymium oxide and mixtures thereof.

9. The method of claim 7 wherein the source of fluoride ions is a compound selected from the group consisting of compounds capable of yielding zirconium oxide, compounds capable of yielding praseodymium oxide and mixtures thereof.

10. The method of claim 7 wherein the source of halide ions selected from the group consisting of chloride and bromide ions is a compound selected from the group consisting of compounds capable of yielding zirconium oxide, compounds capable of yielding praseodymium oxide and mixtures thereof.

References Cited in the file of this patent

UNITED STATES PATENTS

| | | |
|---|---|---|
| 2,623,833 | King et al. | Dec. 30, 1952 |
| 2,875,085 | Morris et al. | Feb. 24, 1959 |
| 2,875,086 | Weyl | Feb. 24, 1959 |

FOREIGN PATENTS

| | | |
|---|---|---|
| 1,058,919 | Germany | June 4, 1959 |
| 5,239 | Japan | Aug. 21, 1954 |

UNITED STATES PATENT OFFICE

CERTIFICATE OF CORRECTION

Patent No. 3,012,898 December 12, 1961

Clarence A. Seabright

It is hereby certified that error appears in the above numbered patent requiring correction and that the said Letters Patent should read as corrected below.

Column 2, line 10, for "fluoride", first occurrence, read -- alkali metal --; same line, strike out "fluoride" second occurrence; line 13, for "afluoride" read -- a fluoride --.

Signed and sealed this 17th day of April 1962.

(SEAL)
Attest:

ESTON G. JOHNSON
Attesting Officer

DAVID L. LADD
Commissioner of Patents